Sept. 20, 1971 J. H. ARNDT 3,606,544

REFRACTIVE SHUTTER FOR ROTATING PRISM CAMERAS

Original Filed May 16, 1966 2 Sheets-Sheet 1

Joseph H. Arndt,
INVENTOR.
BY.
James H. Griffin
ATTORNEY.

REFRACTIVE SHUTTER FOR ROTATING PRISM CAMERAS

Original Filed May 16, 1966

OPACITY INTERNAL REFLECTION

Joseph H. Arndt,
INVENTOR.
BY
James H. Griffin
ATTORNEY.

United States Patent Office 3,606,544
Patented Sept. 20, 1971

3,606,544
REFRACTIVE SHUTTER FOR ROTATING PRISM CAMERAS

Joseph H. Arndt, Boulder, Colo., assignor to TRW Inc., Redondo Beach, Calif.

Continuation of application Ser. No. 550,327, May 16, 1966. This application Aug. 18, 1969, Ser. No. 866,444
Int. Cl. G03b *41/06, 41/08*
U.S. Cl. 352—116 3 Claims

ABSTRACT OF THE DISCLOSURE

A rotating prism is used as a shutter to intermittently transmit light to film that is moved in timed relation with the rotating prism shutter. The prism shutter contains an interface between two media of different index of refraction. The interface orientation and the index of refraction to pass light are adjusted such that desirable light passing through the prism will meet the interface at an angle of incidence which is less than the critical angle, and, hence, will pass through the interface. Unwanted light will be incident to the interface at an angle greater than the critical angle and, hence, will be totally reflected and not pass through the interface.

The present application is a continuing application of my prior co-pending application Ser. No. 550,327, filed on May 16, 1966 and assigned to the assignee of the present application.

BACKGROUND OF THE INVENTION

This invention relates to moving-film cameras and the like; and more particularly the invention relates to an improved rotating prism shutter for use in compensating for the continuous movement of camera film or some other sensory or recording member and for performing the shuttering function in highly precise and controllable manner. The principles of the invention will be discussed in connection with high-speed motion picture cameras of the rotating prism type, since that is the application for which the inventive concepts were intended.

Present high-speed motion picture cameras often use rotating prisms to compensate for the fact that the film is continuously moving during exposure. Essentially, a rotating prism compensator in its simplest form consists of a rotating glass block geared to the film drive mechanism and located between the objective lens of the camera and the focal plane. The refractive power of the rotating block produces an image displacement rate that is approximately identical with the speed of travel of the film throughout the brief interval of exposure. At the beginning of film exposure, light rays striking the glass surface of the rotating prism are displaced upwardly slightly by the refractive angle of the glass. As the film continues to travel downward or upward across the field of exposure, the prism continues to rotate, and the image displacement caused by the prism decreases until the faces of the glass block are perpendicular to the incoming light (and parallel to the film) so that image displacement is at zero. Then as the film continues to travel, the prism continues to rotate and displacement of the image continues in the opposite direction until the termination of film exposure. The effect of the compensating displacement by rotating prism is to cause the exposing image to follow the film being exposed, so that smearing or blurring due to film movement will be minimized.

The rotating prism effect has not been perfect, however, especially if, during the exposure of the film, the prism is required to move more than 10 or 12 degrees relative to the optical axis or line of sight of incoming light. Moreover, if film exposure is to be prevented both before and after the prism is in its accurate compensation range, an additional shutter mechanism is necessary in optical series with the prism and the focal lens of the camera. Such shutters must also be geared to the film drive and are expensive and difficult to maintain in perfectly accurate timing. Moreover, most known shutters will not meet the 10–12° requirement; rather, they continue to transmit light until the prism has rotated through 25 or more degrees. Also, the transmission of light through the shutter decreases gradually with rotation of the prism, whereas the shutter should ideally remain fully open during the desired exposure time and then closed abruptly. Another serious disadvantage of present shutters is their load on the drive motor. The film, prism, and shutter must reach their desired speed from rest nearly instantaneously. A typical camera of this type may require two or three thousand watts, which often must be supplied by auxiliary generating equipment. The instant invention will reduce the motor load and thus the power requirements.

Accordingly, it is the general object of the instant invention to provide an improved shutter and prism arrangement. More particularly, it is desired to provide a shutter that remains fully open during the desired exposure of camera film, or the like, and then closes abruptly immediately at the end of the exposure period. Likewise, it is an object of the invention to provide a refractive shutter system which is precise enough to be able to be designed to close at less than a one degree angle of incidence to the incoming light or up to more than 40 degrees angle of incidence, or anywhere within that range. It is also an object of the invention to reduce the inertia of moving parts and the power required to operate the camera.

SUMMARY OF THE INVENTION

In the achievement of the above and other objects, and as a feature of the instant invention, there is provided a new refractive prism which, rather than using one solid block of glass or other transparent material, employs several media with different indices of refraction. Thus the prism of the instant invention contains within its mass one or more interfaces which provide two or more transparent media of different index of refraction. The orientation of the interfaces and the specific indices of refraction will then be varied to provide that desirable light passing through the prism will meet the above-specified interfaces at an angle of incidence which is less than the critical angle of incidence and thus will pass through the interface. On the other hand, unwanted light will be caused to strike at least one of the interfaces of the prism at an angle greater than the critical angle, so that the unwanted light will be totally reflected and will not pass through the interface.

The principles of the invention contemplate that a prism-shutter might be designed wherein the opposite relationships to those as specified above are employed. That is to say, desired light might be totally reflected while undesired light is not. Either way, the principle of the invention is to employ a refractive shutter for rotating cameras and the like which differentiates between desired and undesired light by the principle of total internal reflection, rather than by using the inherent transparency or opacity of materials for gating light passage between the objective lens and the film of a high-speed camera, and similar devices (e.g., motion picture editors).

Other objects and features of the instant invention and a better understanding thereof may be had by referring to the following description and claims taken in conjunction with the accompanying drawings.

DESCRIPTION OF THE PREFERRED EMBODIMENT

Figures 1, 2A, 2B, 2C, 2D, 2E, 2F, 2G, 3A, 3B:
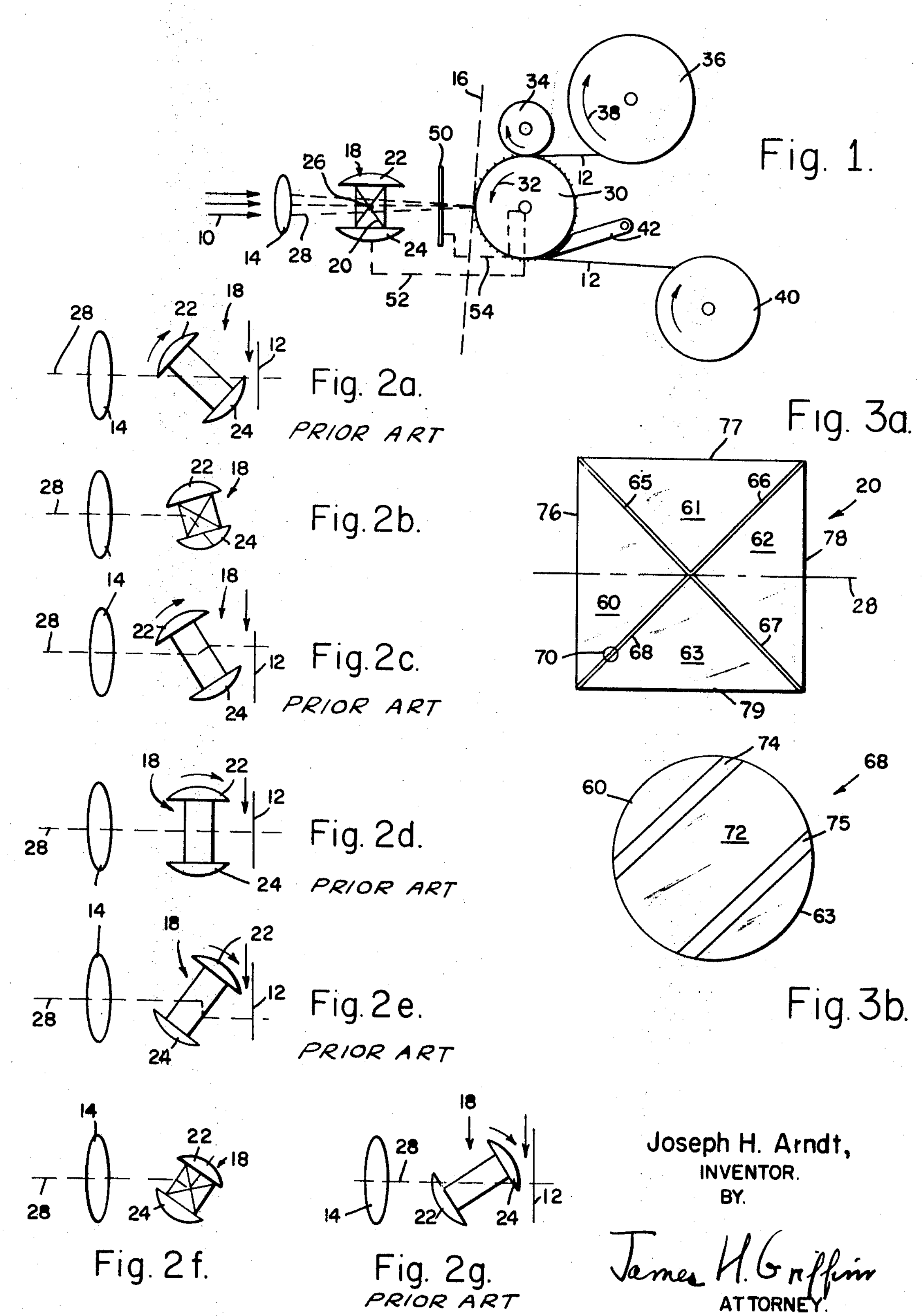
Fig. 1. Fig. 2a. PRIOR ART Fig. 2b. Fig. 2c. PRIOR ART Fig. 2d. PRIOR ART Fig. 2e. PRIOR ART Fig. 2f. Fig. 2g. PRIOR ART Fig. 3a. Fig. 3b.
FIG. 1 is a schematic illustration of high-speed camera system in which rotating prism concept of the instant invention might be employed.
FIG. 2*a* through FIG. 2*g* illustrate the performance of the rotating prism of the system of FIG. 1.
FIGS. 3*a* and 3*b* illustrate the construction of a prism-shutter according to the principles of the instant invention.

Referring to FIG. 1, the illustrative application of the inventive idea is in a high-speed camera system wherein an image embodied in the light rays shown at 10 is recorded on film 12. For this purpose, a lens 14 is mounted to focus the light rays 10 at a focal plane represented by the dashed lines at 16, wherein the film 12 is passed for exposure by the camera mechanism. Somewhere between the lens 14 and the focal plane 16 is located a rotating prism 18 having transparent material 20, usually glass, and upper and lower shutters components 22 and 24, respectively. The refractive shutter mechanism 18 is mounted to rotate about an axis 26 perpendicular to the optical axis 28 of the lens 14 and of the entire camera mechanism.

In the camera system of FIG. 1, the film 12 is passed through the focal plane 16 at a point where it intercepts the optical axis 28 by a sprocket wheel 30 rotated in a counter-clockwise direction illustrated by the arrow 32 by an actuating mechanism not shown herein. A holddown roller 34 cooperating with the sprocket wheel 30 insures that the film 12 is held closely to the periphery of the sprocket wheel 30 as is passes through the optical axis 28. Film is stored on a supply spool 36 which rotates in a clockwise direction indicated by the arrow 38 to unwind film for use upon the sprocket wheel 30. After exposure, a take-up spool 40 winds up the already exposed film. A stripper 42 is commonly employed in such camera mechanisms in order to insure that the film 12 separates from the sprocket wheel 30 at the proper point for winding onto the take-up spool 40.

Presently, cameras according to the principles of FIG. 1 are found in most standard motion picture film sizes and various film capacities ranging from 100 to 400 feet. The maximum film transport rates in these cameras has been extended in recent years to 200 f.p.s. by the utilization of internal control circuitry which regulates the application of power to the camera motors, so that higher terminal film velocity may be obtained without tearing the film during starting and stopping. Such a system can, therefore, photograph at the rate of 2,000 full size 35 mm. frames per second as the higher performance made possible by such a "transport mechanism" is reached; however, the limitation imposed by the above-discussed film-movement blurring has become a critical parameter of the camera system.

At present, the solution to the blurring problem has been the use of a separate shutter, usually of the rotating sector disc variety, in optical series with the rotary prism (as shown at 50). The effect of such an additional shutter is to limit the duration of exposure to only a few degrees of prism rotation. Such a shutter has as one large disadvantage the need for mechanically coupling it with the film transport sprocket wheel 30 (dotted lines 52 and 54 are shown between the rotating prism 18 and the shutter 50, respectively, and the sprocket wheel 30 to indicate mechanical connection therebetween). By these mechanical couplings to the sprocket wheel 30 a rotating prism, such as that shown at 18, or a shutter, such as that shown at 50, are synchronized with the exposure of the film 12, at least as long as the mechanical adjustment is properly maintained. It is the accomplishment of the instant invention to eliminate the need for such a shutter 50, while not requiring any addition in complexity for the mechanical coupling 52 to the refractive shutter. Alternatively, the dimensions of barrel shutter 22, 24 have been increased. But such devices increase the power required and do not withstand high-speed operations.

Referring to FIG. 2, the various possible positions of the rotating prism 18 are illustrated therein to show how both shuttering and film displacement compensation are performed on incoming light rays as exemplified by the optical axis 28. FIGS. 2*a*, 2*c*, 2*d*, 2*e*, and 2*g* show the light compensation action and opacity shuttering common to the prior art prisms (solid glass) and to the refractive-shutter prism which is the subject of the instant invention. FIGS. 2*b* and 2*f* apply only to refractive-shutter prisms. As the prism 18 rotates clockwise and the film 12 moves downward across the focal plane of the lens 14, the upper shutter component 22 first blocks light passage (FIG. 2*a*), and then rotates out of the way so that light is passed by the prism transparent position 20 at an angle of incidence such that the beams are shifted upward by the prism interface refraction at entry and exit (FIG. 2*c*). FIG. 2*b* shows the usefulness of the refractive shuttering principle at the end of opacity shuttering as shown in FIG. 2*a*. Although the conventional opacity shutter would begin to pass light when it is not yet desirable, the ray 28 is totally internally reflected by the refractive shutter.

The initial upward shift of the frame causes the light beams to begin exposing the film 12 at a point above the optical axis 28 of the objective lens 14. Then, as the film 12 travels downward and the prism 22 rotates clockwise the light beams are refracted less and less, passing through a zero point (FIG. 2*d*) and following the same exposure point of the film 12 down to negative refractions (FIG. 2*e*). Film exposure is finally ended by the intervention of the lower shutter 24 (FIG. 2*g*). If the timing of film travel and prism rotation is properly coordinated, the light beams exemplified at 28 should expose very nearly the same point the film 12 from beginning (FIG. 2*c*) to end (FIG. 2*e*), thus minimizing the blurring which would otherwise occur due the continuous travel of the film.

By sudden shuttering using the refraction principle (FIGS. 2*b* and 2*f*), blurring is cut down at the beginning (2*b*) and end (2*f*) of each exposure. Although the opacity shutter would still be passing light, in position 2*f*, this is undesirable since the prism 20 no longer compensates adequately. The ray 28 is totally internally reflected by the refractive shutter prism and does not reach the film 12.

Referring to FIG. 3*a*, the rotating prism 20 of FIG. 1 is shown in greater detail therein as being constructed of four separate prisms 60, 61, 62, and 63, all of which are combined together to provide interfaces 65, 66, 67, and 68, therebetween in addition to the normal peripheral interfaces of such a rotating prism.

Referring to FIG. 3*b*, a section 70 of the prism of FIG. 3*a* enlarged and examined in detail shows that an interface such as the interface 68 selected for illustration consists of a layer of optical cement 72 and dielectric coatings 74 and 75, associated with the prisms 60 and 63, respectively, appearing between the prisms and the optical cement 72. Variation of the values of the optical cement 72 and of the dielectric coating layer 74 and 75 will vary the cut-off angle of incidence of the prism of FIG. 3*a*. The term "cut-off angle of incidence" as used herein means the angle between the optical axis 28 and a normal to one of the outer planes of the prism of FIG. 3*a* numbered 76, 77, 78 and 79 at which the prism passes from transparent to non-transparent. It should be noted that the optical cement might be omitted in a system where the interface is fused together or clamped in place without bonding. For example, the interlayer might be air, water, or glass.

If it is desired to have refractive cut-off of light using a rotating prism of the type shown in FIG. 3*a* at about 2° angle of incidence, applicant prefers the use of EK 110 optical cement at 72 and a coating of calcium fluoride ($CaF_2$) for the dielectric coatings at 74 and 75. The EK 110 optical cement has an index of refraction of 1.70, while the $CaF_2$ has an index of refraction of 1.22. On the other hand, if it is desired to have a cut-off angle of 6°, EK 110 optical cement could be combined with a lithium fluoride (LiF) dielectric coating at 74 and 75. LiF has an index of refraction of 1.29. For a cut-off angle of incidence of about 13°, applicant prefers Crown Optical Cement at 72 and $CaF_2$ as the dielectric coating at 74 and 75; Crown Optical Cement has an index of refraction of 1.52. For a cut-off angle of incidence of about 14°, EK 110 optical cement may be used with magnesium fluoride $MgF_2$ having an index refraction of 1.38. For a cut-off angle of incidence of about 20°, Crown Optical Cement with lithium fluoride is preferred.

Referring to FIG. 4, the views presented therein are intended to illustrate both prior art barrel shutters and the refractive shutter of the instant invention at various angles of incidence to the light beam gated thereby. The first column labeled "Opacity" is so called because the prior art prisms, being blocks of pure glass, prevented the passage of light therethrough only by rotating some opaque surface into the path of some of the light beams. On the other hand, the rotating prism shutter disclosed herein is illustrated in the right-hand column and is labeled "Internal Reflection," because the light beams are gated as a function of angle of incidence therein by reflection off the interfaces at 65–68, i.e. —internal reflection within the prism itself.

Figure 4A:
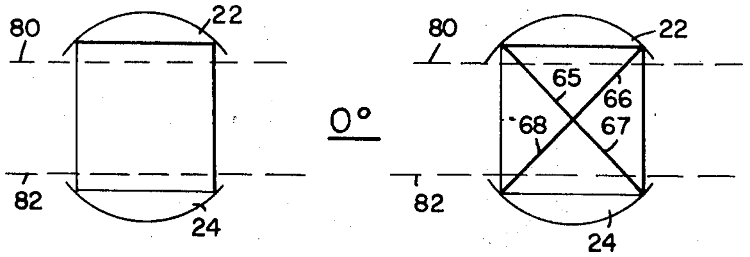
Fig. 4a. PRIOR ART
FIG. 4*a* through FIG. 4*d* illustrate schematically and compares the performance of barrel shutters as used in the prior art with refractive shutters constructed according to the concepts discussed herein.

Referring particularly to FIG. 4*a*, both the prior art opacity-type prism and the internal reflection prism of the instant invention would ordinarily pass light beams as represented at 80 and 82 without either change in direction or translation (as shown in FIGS. 2*b* and 2*d*) when the angle of incidence is 0°. The dashed lines 80 and 82 represent the boundaries of the light field passing through the prisms of FIG. 4*a*, the boundaries being set by the upper and lower shutters 22 and 24 in the 0° configuration.

Figure 4B:
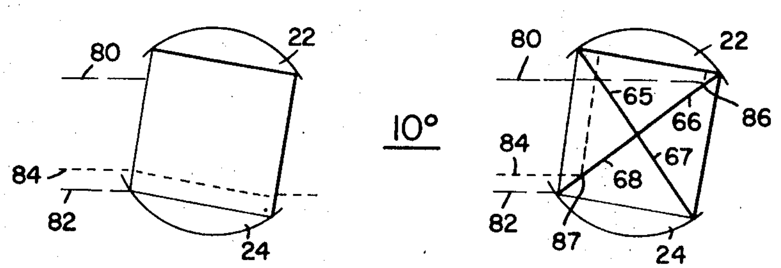
Fig. 4b. PRIOR ART

FIG. 4*b* represents the effect upon the incoming light field of a 10° rotation of either the opacity or internal reflection prisms. It can be seen that the effect of the rotation of the opacity prism is that the lower shutter 24 cuts off incoming light so that the field between the dotted line 84 and the lower line 82 is cut off, while the upper shutter 22 cuts off outgoing light such that no added portions of the field of incoming light are able to pass through the opacity prism.

On the other hand, a 10% rotation of an internal reflection prism, designed according to the principles discussed above, with critical parameters such that no light is to be passed at 10° angle of incidence would result in reflection of the light rays 80 and 84 (and all those in between) off the interfaces 66 and 68, respectively, at points numbered 86 and 87, respectively at a critical angle greater than 45°. In general, no light should be passed when the shutter of the invention has rotated through an angle on the order of 12°. Once this internal reflection occurs, the light rays such as 80 and 84 are completely diverted from their path through the prism and wind up striking one of the opaque members 22 or 24. Since the internal reflection prism for FIG. 4*b* representing 10° rotation, has already passed the critical angle of greater than 45°, so that internal reflection deflects the entire light field into the opaque member 22, it will be obvious that the internal reflection prisms at 20° and 30° will do the same. The result is that at some predetermined angle between 0° and 10° rotation of the internal reflection prism all the radiation encompassed by the light rays 80 and 82 is suddenly prevented from passing through the prism.

Figure 4C:
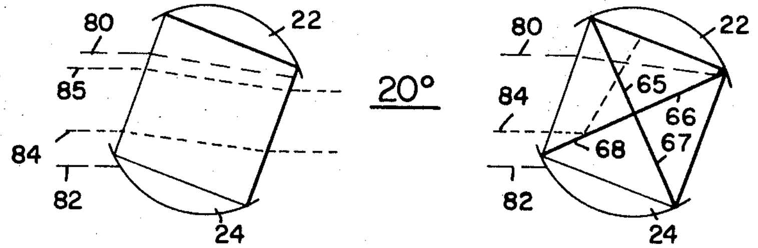
Fig. 4c. PRIOR ART
Figure 4D:
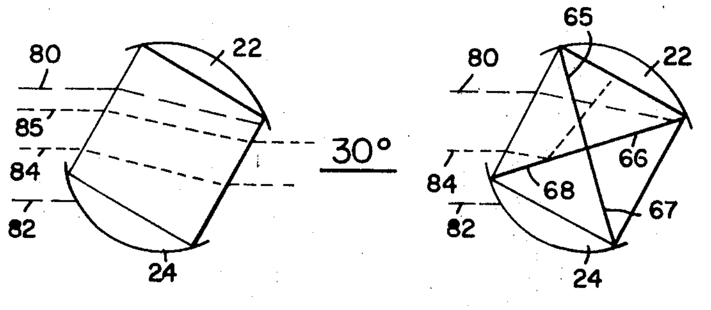
Fig. 4d. PRIOR ART

On the other hand, the opacity prisms of FIGS. 4*c* and 4*d* show how greatly deficient in this respect an opacity prism is without the aid of an additional shutter such as that shown at 50 of FIG. 1. In FIG. 4*c*, it can be seen that 20° rotation of the opacity prism has only permitted the cut off of about half the field between the light rays 80 and 82, leaving all the radiation between light rays 84 and 85 to pass through the prism and continue exposing the film 12. Likewise in FIG. 4*d*, even at 30° a substantial amount of light radiation (again between the light rays 84 and 85) is not cut off by either the shutter 24 or the shutter 22. The result on the exposure of the film 12 of this very slow cut off of light by an opacity prism can be easily imagined; the resultant film blurring and slow response of the rotating prism is a most severe limitation on present day high-speed motion picture cameras. The internally reflected light in the refractive shutter prism can be prevented from reaching the film by proper placement of absorbing material in its path, such as coating the faces 22 and 24 with an absorbing material of the type sold under the trademark "Luxorb." The barrel shutter shown is thus not necessarily required; it was included to illustrate how the refractive shutter might be extrinsically identical to, and interchangeable with, present devices.

Figure 5:
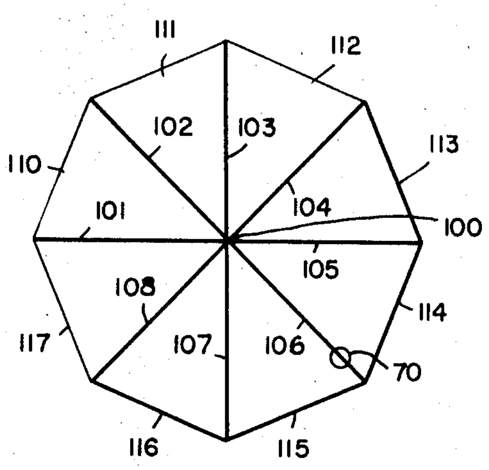
FIG. 5 sets forth a second refractive shutter according to the principles of the instant invention.

Referring to FIG. 5, the eight-sided prism used therein is illustrative of another application of the principles of the invention for the manufacture of high-speed refractive shutters. The eight-sided prism of FIG. 5 may be considered to consist of eight separate prisms and has a center 100 about which it would rotate when used on a rotating prism high-speed camera and has eight interfaces 101, 102, 103, 104, 105, 106, 107 and 108. In addition, an eight-sided prism would have eight planes of its transparent material facing outward to receive light incidence from the outside; these planes are numbered 110, 111, 112, 113, 114, 115, 116, and 117, respectively.

In the construction of an eight-sided prism as shown in FIG. 5, the cross-section of each interface 101–108 would be similar to the cross-section shown in FIG. 3*b*, except that applicant has found that the use of a dielectric coating between the transparent material of adjacent ones of the light prisms (similar to 60 and 63) and the optical cement 72 may be dispensed with. Thus, close examination of one of the interfaces 101–108 would show simply the adjacent prisms and optical cement therebetween. A typical prism of the sort shown in FIG. 5 could use EK 110 glass at an index of refraction of 1.70 and HE–9 optical cement, with an index of refraction of 1.606. The critical angle of incidence for such a rotating prism would be ±5.55°, and cut off of light transmission above this angle would be almost instantaneous.

From the above discussion it can be seen that the principles of the instant invention provide a truly blurless refractive shutter which remains fully transparent of light until a certain critical angles is reached and then closes far more abruptly than was heretofore possible with opacity shutters. For example, a shutter-prism of the type taught herein can pass from complete transparency to complete opacity in less than 1°; while an opacity-type shutter requires 25 or more degrees rotation. This depends on the numerical aperture of the lens values shown for collimated light. In fact, it has been applicant's experience that a refractive shutter of the sort taught herein is capable of passing from complete light transmission to complete cut-off far faster than the combination of an opacity rotating prism and a cooperating shutter of the sort shown at 50 of FIG. 1. Moreover, not only is an internal reflection or refractive shutter faster in its transition, but also it is a very precise instrument, the parameters of which can be closely controlled through a wide angular range simply by varying the materials with which such a prism is made.

An additional important feature of the refractive shutter disclosed herein is that it can be substituted for present shutters with no change or reconstruction of the optical system or mechanical images of the camera. Moreover, since the shutter components 22 and 24 are not strictly needed in refractive shutters and since the transparent portion can be made quite small, shutters, according to the invention, can be made very small, thus producing a low moment of inertia, which in turn greatly improves speed, and reduces power requirements. A low moment of inertia is especially important at high speeds. All-in-all, applicant's new refractive shutter concepts provide for a smaller, lighter, and more easily maintainable camera which at the same time has far greater precision and fineness of performance than is presently possible.

Applicant wishes to point out that the principles of refractive shuttering should not be considered to be confined merely to the high-speed motion picture camera area which was discussed herein, but would apply with equal usefulness and improvement over the prior art to a number of different optical systems where the transition from full transparency to complete interruption of light travel is desired to be made quickly and at a precise point. Therefore, although the invention has been described in its preferred form with a certain degree of particularity, it should be understood that the present disclosure of one preferred embodiment has been made only by way of example and that numerous changes in the details of construction and in the combination and arrangement of components may be resorted to without departing from the spirit and the scope of the invention as hereinafter claimed.

What is claimed is:

1. In a high-speed moving-film camera of the type where a film is moved continuously during exposure:

a refractive and reflective shutter for permitting light rays from a predetermined fixed field of view to enter the camera and expose the film, said shutter consisting of a plurality of prisms bonded together and forming interfaces between contacting prisms, said shutter being continuously rotatable for permitting light rays to expose the film while the shutter rotates through a predetermined angle of no more than on the order of 12°, the ratio of the index of refraction of said prisms to the index of refraction of an interface thereof being so selected that the critical angle is greater than 45°, and said shutter being so arranged and said indices of refraction being so selected that light rays from the field of view pass through said shutter by refraction without total reflection toward the film, while the light rays are totally reflected at one of the interfaces when the shutter has rotated beyond the predetermined angle, thereby to prevent light rays from passing through said shutter to the film; and a lens system disposed ahead of said shutter for focusing light rays from said predetermined field of view on the film.

2. A camera as defined in claim 1 wherein said shutter consists of four prisms bonded together along two interfaces intersecting at right angles.

3. A camera as defined in claim 1 wherein said shutter consists of *n* prisms having interfaces between adjacent prisms, wherein *n* is an integer no less than 4.

References Cited

UNITED STATES PATENTS

| | | | |
|---|---|---|---|
| 2,939,362 | 6/1960 | Cole | 352—105 |
| 3,217,623 | 11/1965 | Hotchkiss | 350—285UX |
| 3,259,449 | 7/1966 | Barocela | 352—113X |

LOUIS R. PRINCE, Primary Examiner

D. E. CORR, Assistant Examiner

U.S. Cl. X.R.

350—285